(12) United States Patent
Kaltenbach et al.

(10) Patent No.: US 8,308,605 B2
(45) Date of Patent: Nov. 13, 2012

(54) METHOD FOR CONTROLLING AND/OR REGULATING A HYBRID DRIVE ARRANGEMENT

(75) Inventors: Johannes Kaltenbach, Friedrichshafen (DE); Stefan Wallner, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 414 days.

(21) Appl. No.: 12/671,133

(22) PCT Filed: Aug. 8, 2008

(86) PCT No.: PCT/EP2008/060434
§ 371 (c)(1),
(2), (4) Date: Jan. 28, 2010

(87) PCT Pub. No.: WO2009/027201
PCT Pub. Date: Mar. 5, 2009

(65) Prior Publication Data
US 2010/0204004 A1    Aug. 12, 2010

(30) Foreign Application Priority Data
Sep. 1, 2007   (DE) .................. 10 2007 041 569

(51) Int. Cl.
B60W 10/02   (2006.01)

(52) U.S. Cl. ................................................ 477/5

(58) Field of Classification Search .......... 477/3, 5; 903/912
See application file for complete search history.

(56) References Cited

U.S. PATENT DOCUMENTS

| | | | |
|---|---|---|---|
| 4,021,712 A | 5/1977 | Ishihara et al. | |
| 5,890,392 A | 4/1999 | Ludanek et al. | |
| 6,059,059 A | 5/2000 | Schmidt-Brucken | |
| 6,077,189 A | 6/2000 | Kojima et al. | |
| 6,166,512 A | 12/2000 | Kojima | |
| 6,176,807 B1 | 1/2001 | Oba et al. | |
| 6,319,168 B1 | 11/2001 | Morris et al. | |
| 6,504,259 B1 | 1/2003 | Kuroda et al. | |
| 6,505,109 B1 | 1/2003 | Strandell et al. | |
| 6,506,139 B2 | 1/2003 | Hirt et al. | |
| 6,524,219 B2 | 2/2003 | Mesiti et al. | |
| 6,543,561 B1 | 4/2003 | Pels et al. | |
| 6,574,535 B1 | 6/2003 | Morris et al. | |
| 6,871,734 B2 | 3/2005 | Kupper et al. | |
| 6,887,184 B2 | 5/2005 | Buchannan et al. | |
| 6,938,713 B1 | 9/2005 | Tahara et al. | |
| 7,395,837 B2 | 7/2008 | Foster et al. | |
| 7,464,616 B2 | 12/2008 | Leibbrandt et al. | |
| 7,500,932 B2 | 3/2009 | Katakura et al. | |
| 7,686,112 B2 * | 3/2010 | Shiiba .................... | 180/65.275 |

(Continued)

FOREIGN PATENT DOCUMENTS

DE          44 38 914 A1      5/1996

(Continued)

*Primary Examiner* — Roger Pang
(74) *Attorney, Agent, or Firm* — Davis & Bujold PLLC

(57) ABSTRACT

A method of controlling and/or regulating a hybrid drive system of a vehicle, with at least one internal combustion engine and at least one electric machine which can be coupled to the input shaft of an automated transmission, at least some of the time, by at least one clutch to facilitate driving of the vehicle such that at least one energy accumulator is charged by the electric machine which is operated as a generator and driven by the internal combustion engine. The electric machine is a synchronizer machine that is continually energized by maintaining a nominal speed of the synchronizer machine below an inflexion speed (n_Eck) during the charging process.

3 Claims, 1 Drawing Sheet

U.S. PATENT DOCUMENTS

| | | | |
|---|---|---|---|
| 8,190,317 B2 * | 5/2012 | Kim et al. | 701/22 |
| 2003/0010548 A1 | 1/2003 | Mesiti et al. | |
| 2005/0086123 A1 | 4/2005 | Wakitani et al. | |
| 2005/0164827 A1 | 7/2005 | Beaty et al. | |
| 2005/0209047 A1 | 9/2005 | Berger et al. | |
| 2005/0221947 A1 | 10/2005 | Mesiti et al. | |
| 2006/0113858 A1 | 6/2006 | Hino et al. | |
| 2006/0199696 A1 | 9/2006 | Gouda et al. | |
| 2007/0056783 A1 | 3/2007 | Joe et al. | |
| 2007/0095584 A1 | 5/2007 | Roske et al. | |
| 2007/0102211 A1 | 5/2007 | Nozaki et al. | |
| 2007/0114081 A1 | 5/2007 | Iwanaka et al. | |
| 2008/0036322 A1 | 2/2008 | Franke | |
| 2008/0245332 A1 | 10/2008 | Rimaux et al. | |
| 2008/0254935 A1 * | 10/2008 | Kasuga et al. | 477/3 |
| 2009/0051309 A1 | 2/2009 | Rehm et al. | |
| 2009/0146615 A1 | 6/2009 | Zillmer et al. | |
| 2009/0223727 A1 | 9/2009 | Tolksdorf | |
| 2010/0210411 A1 * | 8/2010 | Tang et al. | 477/5 |
| 2012/0108385 A1 * | 5/2012 | Sano et al. | 477/5 |

FOREIGN PATENT DOCUMENTS

| | | |
|---|---|---|
| DE | 196 31 983 C1 | 2/1998 |
| DE | 197 09 457 A1 | 9/1998 |
| DE | 198 14 402 A1 | 10/1999 |
| DE | 199 45 473 A1 | 4/2000 |
| DE | 199 39 334 A1 | 3/2001 |
| DE | 101 26 348 A1 | 1/2002 |
| DE | 103 40 529 A1 | 3/2004 |
| DE | 103 27 306 A1 | 1/2005 |
| DE | 10 2004 022 767 A1 | 7/2005 |
| DE | 600 22 593 T2 | 2/2006 |
| DE | 11 2006 001 985 T5 | 5/2006 |
| DE | 696 31 468 T2 | 6/2006 |
| DE | 10 2005 015 657 A1 | 10/2006 |
| DE | 10 2006 019 679 A1 | 11/2006 |
| DE | 10 2005 057 607 B3 | 4/2007 |
| DE | 10 2005 051 382 A1 | 5/2007 |
| EP | 1 167 834 A1 | 1/2002 |
| EP | 1 177 930 A2 | 2/2002 |
| EP | 1 219 493 A1 | 7/2002 |
| EP | 13 19 546 A1 | 6/2003 |
| EP | 1 450 074 A2 | 8/2004 |
| EP | 1 468 865 A2 | 10/2004 |
| EP | 1 527 927 A1 | 5/2005 |
| EP | 1 256 866 B1 | 3/2006 |
| EP | 1 714 817 A1 | 10/2006 |
| EP | 1 744 083 A2 | 1/2007 |
| EP | 1 762 417 A1 | 3/2007 |
| EP | 1 765 305 A2 | 5/2007 |
| FR | 2 722 738 A1 | 1/1996 |
| FR | 2 796 437 A1 | 1/2001 |
| FR | 2 892 471 A1 | 4/2007 |
| WO | 00/03163 A1 | 1/2000 |
| WO | 02/086343 A1 | 10/2002 |
| WO | 03/066367 A1 | 8/2003 |
| WO | 2004/111441 A1 | 12/2004 |
| WO | 2006/020475 A2 | 2/2006 |
| WO | 2006/053624 A1 | 5/2006 |

* cited by examiner

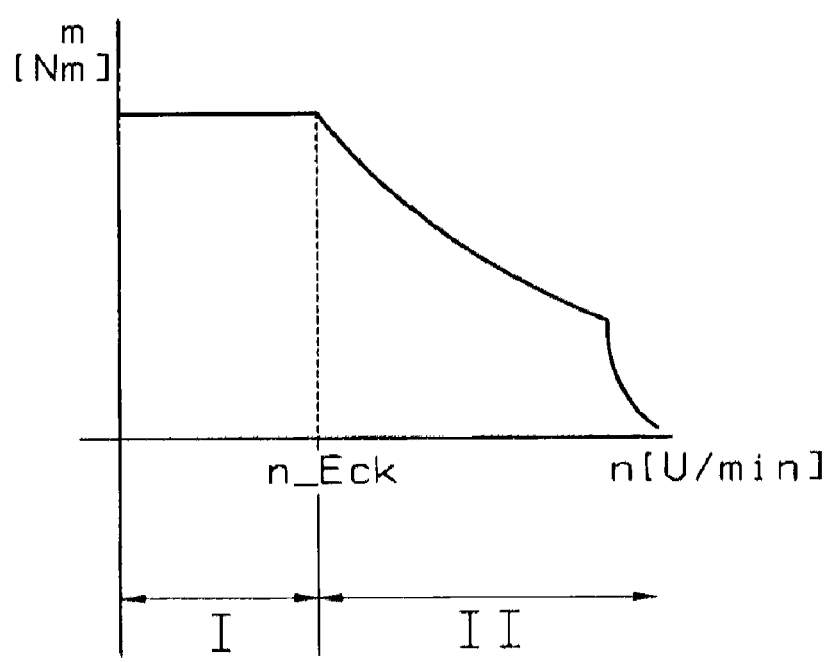

METHOD FOR CONTROLLING AND/OR REGULATING A HYBRID DRIVE ARRANGEMENT

This application is a National Stage completion of PCT/EP2008/060434 filed Aug. 8, 2008, which claims priority from German patent application serial no. 10 2007 041 569.0 filed Sep. 1, 2007.

FIELD OF THE INVENTION

The present invention concerns a method for controlling and/or regulating a hybrid drive arrangement for a vehicle.

BACKGROUND OF THE INVENTION

Hybrid drive systems for vehicles are known from automotive technology. In the known hybrid drive systems the drivetrain of the vehicle comprises an internal combustion engine which can be coupled by a clutch to an input shaft of a transmission with variable transmission ratios. Furthermore, associated with the input shaft is at least one electric machine, the operation of which can be changed between a generator or as a motor.

Consequently, during motor operation the electric machine can be used to power the vehicle and during generator operation it can be used to charge an energy accumulator. During motor operation, the energy accumulator can supply the energy required for operating the electric machine. For charging the energy accumulator, the electric machine is operated in the generator mode and is then driven by the internal combustion engine.

After very long stationary periods or after a long time in a workshop, the energy accumulators are fully discharged and are no longer ready to operate. To bring them back to a condition of readiness to operate it is therefore necessary to re-charge them. Usually an energy accumulator is re-charged in the workshop using charging equipment. Disadvantageously, this entails having an external source of energy.

SUMMARY OF THE INVENTION

The purpose of the present invention is to propose a method of the type described at the start, by virtue of which a completely discharged energy accumulator can be charged without any external energy source.

Accordingly, a method for controlling and/or regulating a hybrid drive system having at least one internal combustion engine and at least one electric machine can be proposed, these being coupled at least some of the time by means of at least one clutch to the input shaft of an automated transmission for driving the vehicle, such that at least one energy accumulator is charged by the electric machine being driven in the generator mode by the internal combustion engine, and such that with a energized synchronizer machine as the electric machine, a nominal rotation speed, lower than an inflexion speed, is maintained during the charging process.

In this way a fully discharged energy accumulator can be charged without any additional external energy, since the nominal speed is kept within a basic speed range, i.e. below the inflexion speed or bend speed of the synchronizer machine. For example, the internal combustion engine of the vehicle can be started with the help of a conventional starter unit. The clutch is engaged and the internal combustion engine can drive the electric machine in the generator mode to begin the process of charging the energy accumulator. Since the nominal speed is below the inflexion speed, no energy is needed for the field weakening usually provided. Thus, the empty energy accumulator can be charged in the vehicle without outside assistance, so that a self-sufficient system is realized.

For speed regulation during a charging process the clutch control system can preferably be used for controlling the nominal speed. Thus, the desired speed range during charging can be kept too. The charging of the energy accumulator therefore takes place under speed regulation by the synchronizer machine, which can be done simply and steadily in terms of regulation technology.

Preferably, the clutch can be operated by the clutch control system in slipping mode to keep the nominal speed of the synchronizer machine within the basic speed range. This is necessary since the idling speed of the internal combustion engine is usually higher than the inflexion speed, which latter is usually around 300 to 400 revolutions per minute. In this way the clutch transmits a controlled appropriate torque such that the speed of the synchronizer machine is kept below the inflexion speed during charging of the energy accumulator.

BRIEF DESCRIPTION OF THE DRAWING

Below, the invention is explained in greater detail with reference to the drawing. The single FIGURE illustrating the invention shows a diagram of a torque variation against speed, for a continually energized synchronizer machine.

DETAILED DESCRIPTION OF THE PREFERRED EMBODIMENTS

From the diagram it is clear that the continually energized synchronizer machine at first shows a constant value of the torque m up to an inflexion speed or bend speed $n\_Eck$. The section in which the torque m has a constant value is called the basic speed range I. After this the torque m decreases continuously. This region is called the field weakening range II of the continually energized synchronizer machine.

However, to operate the continually energized synchronizer machine in the field weakening range II, energy is needed in order to bring about the weakening of the field. Accordingly, when the energy accumulator is completely discharged it is proposed to carry out the charging process in the basic speed range I so that no additional external energy is needed. According to the method of the invention, this is achieved by operating the continually energized synchronizer machine under speed control with a nominal speed below the inflexion speed $n\_Eck$ during the charging of the energy accumulator.

INDEXES m Torque of the synchronizer machine
n Speed of the synchronizer machine
$n\_Eck$ Inflexion speed of the synchronizer machine
I Basic speed range
II Field weakening range

The invention claimed is:
1. A method of at least one of controlling and regulating a hybrid system for a vehicle, the hybrid system comprising at least one internal combustion engine and at least one electric machine which are coupled, at least temporarily during operation of the vehicle, to an input shaft of an automated transmission by at least one clutch for driving a vehicle such that at least one energy accumulator is charged by the electric machine operating as a generator and driven by the internal combustion engine, the method comprising the steps of:

maintaining a nominal speed lower than an inflexion speed (n_Eck) with a continually energized synchronizer machine as the electric machine during the charging process; and controlling, via a clutch control system, the nominal speed during the charging process.

2. A method of at least one of controlling and regulating a hybrid system for a vehicle, the hybrid system comprising at least one internal combustion engine and at least one electric machine which are coupled, at least temporarily during operation of the vehicle, to an input shaft of an automated transmission by at least one clutch for driving a vehicle such that at least one energy accumulator is charged by the electric machine operating as a generator and driven by the internal combustion engine, the method comprising the steps of:

maintaining a nominal speed lower than an inflexion speed (n_Eck) with a continually energized synchronizer machine as the electric machine during the charging process;

controlling, via a clutch control system, the nominal speed during the charging process; and operating the clutch with the clutch control system in a slipping mode to maintain the nominal speed of the synchronizer machine within a basic speed range (I).

3. A method of controlling a hybrid system of a vehicle which comprises an internal combustion engine and at least one electric machine, the method comprising the steps of:

engaging a clutch at least periodically to couple the internal combustion engine and the electric machine to an input shaft of an automated transmission for driving a vehicle;

driving the electric machine with the internal combustion engine;

operating the electric machine as a generator to charge an energy accumulator, and the electric machine being a synchronizer machine; and maintaining the synchronizer machine at a nominal rotational speed, which is lower than an inflexion speed (n_Eck), during a charging process of the accumulator such that the synchronizer machine is continually energized;

controlling the nominal rotational speed of the synchronizer machine with a clutch control system during the charging process of the accumulator; and operating the clutch in a slipping mode with the clutch control system to maintain the nominal rotational speed of the synchronizer machine within a basic rotational speed range (I).

* * * * *